United States Patent [19]

Webster

[11] 4,074,196

[45] Feb. 14, 1978

[54] SPEEDOMETER AND ODOMETER APPARATUS

[76] Inventor: Douglas G. Webster, 14450 Black Walnut Court, Saratoga, Calif. 95070

[21] Appl. No.: 710,566

[22] Filed: Aug. 2, 1976

[51] Int. Cl.² .............................................. G01P 3/48
[52] U.S. Cl. ............................... 324/166; 235/92 DN
[58] Field of Search ............... 324/166, 168, 171, 173, 324/175, 74; 235/92 DN, 92 PE, 92 T

[56] References Cited

U.S. PATENT DOCUMENTS

| | | | |
|---|---|---|---|
| 3,614,617 | 10/1971 | Blake, Jr. .............................. | 324/166 |
| 3,691,525 | 9/1972 | McClellan, Sr. et al. ............ | 324/166 |
| 3,739,270 | 6/1973 | Miller et al. .......................... | 324/166 |
| 3,746,985 | 7/1973 | Perron .................................. | 324/166 |
| 3,846,701 | 11/1974 | Sampey ................................. | 324/175 |
| 3,908,167 | 9/1975 | Hulls et al. ........................... | 324/166 |
| 3,968,434 | 7/1976 | Dixon et al. .......................... | 324/166 |

Primary Examiner—Rudolph V. Rolinec
Assistant Examiner—Vincent J. Sunderdick
Attorney, Agent, or Firm—Warren M. Becker

[57] ABSTRACT

A speedometer-odometer apparatus is described comprising an encoding apparatus for generating pulses as a function of the distance a vehicle is moved, a calibrating apparatus and an indicating circuit means for visually indicating the distance and speed of the movement. Coupled between the encoding apparatus and the indicating circuit means, the calibrating apparatus is provided for controlling the number of pulses delivered to the indicating circuit means from the encoding apparatus so that the indicating circuit means will provide a predetermined output when the vehicle in which the apparatus is mounted is moved a predetermined distance. For providing a highly accurate and direct readout of the distance, there is provided, in the indicating circuit means and coupled to the output of the calibrating apparatus, a plurality of division circuits. The division circuits are provided for dividing the output of the calibrating means so as to provide a direct readout of the distance the vehicle moves to an accuracy of at least one part in ten thousand. For providing an indication of the speed of the vehicle there is also provided, coupled to the output of the calibrating means, a time base generator, a second plurality of division circuits and latches. The time base is provided for generating at predetermined intervals a control signal for controlling the output of the second plurality of division circuits. The latches are provided for displaying the output of the division circuits in a visual display means in a predetermined period. The division circuits and display means are provided for indicating the speed of the vehicle to an accuracy of one part in ten thousand readable to the nearest 1/10 mph. In one embodiment, the calibrating means comprises a counter means, a plurality of settable switches for setting a calibrating number in the calibrating means and comparing means for comparing the calibrating number and the contents of the counter means. Upon a predetermined correspondence between the contents of the counter means and the calibrating number, a control signal is generated for controlling the number of pulses at the output of the calibrating means. In another embodiment, the calibrating means comprises a pair of series-connected phase lock loops. In still another embodiment, the calibrating means comprises a first and a second interconnected gear means. To reduce the number of readout circuits and drivers required for a visual readout, a multiplexing switching circuit may be employed.

21 Claims, 6 Drawing Figures

SPEEDOMETER AND ODOMETER APPARATUS

BACKGROUND OF THE INVENTION

The present invention relates to speedometer-odometer apparatus in general and in particular so a speedometer-odometer apparatus comprising a calibrating means for use in vehicles in which highly accurate speed and distance measurements are required or desired.

In a motor vehicle, a conventional speedometer apparatus typically comprises a speedometer cable and a dashboard assembly including a visual indicating means. The speedometer cable interconnects the dashboard assembly to a transmission or drive line of the vehicle. In the dashboard assembly there is usually provided a magnet, a combination of gears and pinions and a needle or other speed indicating means. Typically the gears, which are driven by the speedometer cable, drive a series of rotatable wheels on which are imprinted numbers for accumulating mileage. The magnet, also connected to the speedometer cable, is rotatable and, when rotated, causes a movement of the needle in proportion to its rate of rotation for providing an indication of the speed of the vehicle. There are, of course, other arrangements possible.

Taking note of the fact that a visual readout of the distance that a vehicle travels and the speed at which it travels is a function of tire size, it will be appreciated that, since tire size changes continuously with tire wear, a speedometer-odometer calibration must be made regularly if a relatively accurate indication of speed and distance is to be maintained. The accuracy of the output of a speedometer and odometer apparatus also is affected by normal tire changes, as when winter and summer tires are interchanged on a vehicle, when tires become under and over-inflated or when the magnet in the speedometer becomes partially degaussed To assist drivers to calibrate their speedometer-odometer apparatus, measured miles are posted at various locations along the highways. For convenience, a notice of an upcoming measured mile is generally provided some distance ahead of the beginning of the measured mile to warn the driver and allow him time to adopt and maintain a constant rate of speed. Presently, when abreast of the initial or starting post of the measured mile, the driver notes the odometer reading and the time. After passing the terminating post of the measured mile, the driver again notes the odometer reading and the time. If the speedometer-odometer apparatus is working properly, and the tire size, inflation, etc. correspond to the tire size, inflation, etc. for which the speedometer-odometer apparatus is calibrated, the driver will note as he passes the terminating post that precisely one mile has been added to the odometer reading and that precisely one minute has passed in time since the passage of the initial milepost if the speed adopted and maintained was 60 mph. If these are not the conditions observed by the driver, the driver must note the difference and make a determination as to the correction to be applied to calibrate the apparatus. It may be noted that an actual adjustment of conventional apparatus is generally not possible. Therefore, the calibration must be noted or remembered and applied mentally.

In motor vehicle regulation and speed enforcement, the accurate calibration of speedometers becomes very important. Presently, law enforcement officers employ an apparatus commonly known as the fifth wheel to calibrate their automobile speedometer apparatus. In use the fifth wheel is attached to the officer's motor vehicle and appropriate readings taken to calibrate the speedometer against the output of the fifth wheel. Needless to say, in addition to having to note the calibration on a chart and mentally applying it when involved in traffic control operatons, the use of a fifth wheel to obtain the calibration figures is time-consuming and expensive. Moreover, it may be noted, that when attempting to calibrate the speedometer in a vehicle using the measured mile described above or a fifth wheel, it is difficult to maintain a constant rate of speed over the mile.

SUMMARY OF THE INVENTION

For the foregoing reasons, a principal object of the present invention is a speedometer-odometer apparatus for measuring and displaying the distance of travel and the speed of movement of a moving vehicle, which is reliable, relatively inexpensive and easy to use.

Another object of the present invention is an odometer-speedometer apparatus which has a digital readout and a high degree of accuracy, and which is readily and quickly adjustable to compensate for changes in tire size due to wear, changes in inflation, exchanges, or the like.

In a preferred embodiment of the invention there is provided an encoding apparatus for generating an output as a function of the distance a vehicle is moved. The encoding apparatus is attached to the drive line, transmission or wheel of a motor vehicle and comprises a rotatable disk and detector. A movement of the vehicle rotates the disk and a predetermined number of pulses or equivalent signals are generated at the output of the detector during each revolution of the disk. These pulses are fed to a first plurality of division circuits for generating at their respective outputs a plurality of output signals corresponding to the distance the vehicle moves. The measurement of the distance thus provided corresponds to an accuracy of one pulse per 10,000 pulses. Coupled to the output of the division circuits is a digital visual indicating means for providing a digital visual readout of the distance.

To measure the speed of the vehicle, as well as the distance the vehicle is moved there is also coupled to the output of the encoding apparatus, a second plurality of division circuits, a plurality of latches, a time-base generator and a display circuit. The time-base generator is provided for generating a control signal at predetermined time intervals, and latches are provided for latching in response to the control signal the output of the division circuits for displaying the number of pulses received during a preceding time-base interval. The number of pulses received during one of the time-base time intervals is a measure of the speed of the vehicle.

For calibrating the speedometer-odometer apparatus of the present invention to compensate for tire wear, different inflation levels, etc., a calibrating apparatus is provided, coupled between the output of the encoding apparatus and the division circuits. In one embodiment the calibrating apparatus comprises a counting circuit, a comparing circuit and a plurality of settable switches for setting a calibrating number in the apparatus. Upon occurrence of a predetermined correspondence between the calibrating number and the contents of the counting circuit, a control signal is provided for controlling a gate circuit. The gate circuit, which is coupled between the encoding apparatus and the division circuits, is provided for controlling the number of pulses delivered by the encoding apparatus to the division circuits.

In another embodiment of a calibrating apparatus according to the present invention, there is provided a pair of series-connected phase lock loops. In a first one of the phase lock loops there is a pair of dividing circuits and a voltage controllable oscillator (VCO) for providing an output comprising $N_1 - 1$ pulses for an input of $N_1$ pulses. The second one of the phase lock loops is coupled to the output of the first one of the phase lock loops and also comprises a pair of dividing circuits and a VCO for providing $N_2$-1 output pulses for $N_2$ pulses received from the output of the first phase lock loop. The numbers $N_1$ and $N_2$ comprise calibrating numbers.

In still another embodiment, the calibrating apparatus comprises a gear train. In the gear train there is an arrangement of gears having gear ratios corresponding to the necessary calibrating number.

In addition to the above features, circuit means are also provided in the digital embodiments of the invention for improving the accuracy of the apparatus.

DESCRIPTION OF THE DRAWINGS

The above and other objects, features and advantages of the present invention will be apparent from the detailed description of the accompanying drawings in which.

DETAILED DESCRIPTION OF THE DRAWINGS

Figure 1:
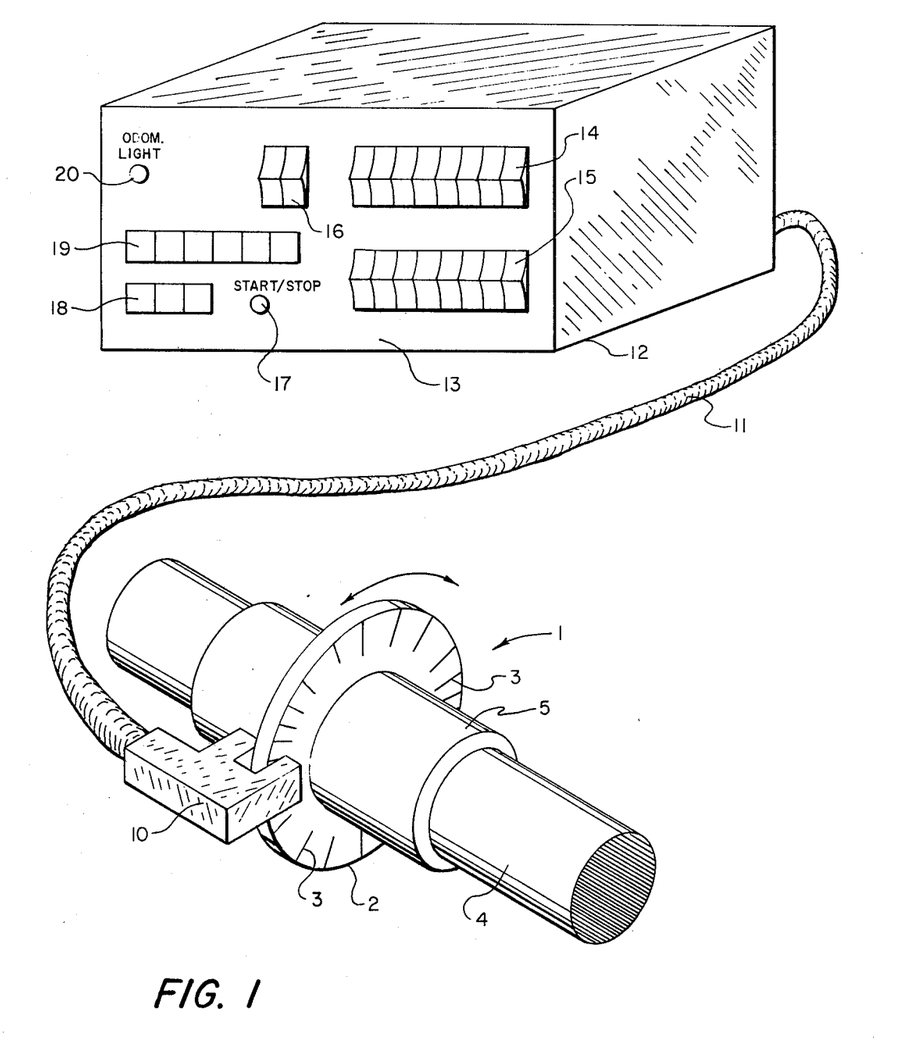
FIG. 1 is a block diagram of a console and an encoding assembly according to the present invention.

Referring to FIG. 1, there is provided, in accordance with the present invention, an encoding assembly 1. Assembly 1 is mounted on a drive shaft 4 of a vehicle for providing a pulse output proportional to the distance the vehicle is moved. In the assembly 1 there is provided a rotatable disk member 2 which rotates with the shaft 4. Disposed at equidistant locations about the periphery of the disk member 2 there is provided a predetermined plurality of sensible elements 3. The actual number of the elements 3 depends on the accuracy desired and is also chosen so that the pulse output can be ratioed down for providing a precise readout of mileage and speed. In a typical embodiment, the number of elements 3 is 184 for a disk member 2 which rotates about 1000 times per mile. To mount the disk 2 to the drive shaft 4 of the vehicle, as shown, there is provided a collar member 5. In a typical installation the collar member 5 and the disk 2 are split into two parts so that, when separated, they may be easily fitted about the drive shaft 4 and rigidly attached thereto. Preferably, when assembled, the disk and collar are symmetrical with respect to the drive shaft so as to not unbalance the drive shaft when the shaft is rotated. Alternatively, the assembly 1 could be mounted directly in or on a transmission or wheel assembly of the vehicle or in or on any other part of the vehicle which moves as a function of the distance the vehicle moves. In still another embodiment, the disk member 2 could be located remote from the transmission and drive line and coupled thereto as by a speedometer-type cable.

Positioned adjacent to the disk member 2 and rigidly mounted to the vehicle for sensing the sensible elements 3 and for generating a pulse in response to each of them as the disk member 2 is rotated, there is provided a detector 10. The type of components used in the detector 10 depends on the type of the sensible elements 3 and the accuracy desired. For example, the elements 3 and detector 10 may comprise photoelectric components or variable reluctance, magnetic, hall-element, capacitive, proximity or any other suitable components. Preferably, the components used are speed-insensitive — e.g., photoelectric and hall-element components, for providing reliable output pulses independent of the angular velocity of the disk member 2.

Located in the cab of the vehicle or in another location in the vehicle, which is convenient to the operator, there is provided a control and display console 12. Console 12 is coupled to the detector 10 of the assembly 1 by means of a cable 11. In the console 12 there is provided a control and display panel 13. In the panel 13 there is provided a first set of eight switches 14, a second set of eight switches 15 and a third set of two switches 16. The switches 14–16 are provided for setting in calibrating numbers and for controllling the operation of the apparatus. Switches 14, 15 and 16 may be of any suitable type such as, for example, those switches commonly known as two-position rocker switches or thumbwheel switches. To the left of switches 15, there is provided a start-stop pushbutton 17. Above pushbutton 17 there is provided a three-stage digital display 18 and a six-stage digital display 19. Displays 18 and 19 are provided for displaying the speed and accumulated mileage of the vehicle and preferably comprise conventional seven-segment light-emitting diodes (LED). Above and to the left of digital display 19 there is provided an odometer light 20. Light 20 is illuminated when the apparatus is totalizing mileage data.

Figure 2:
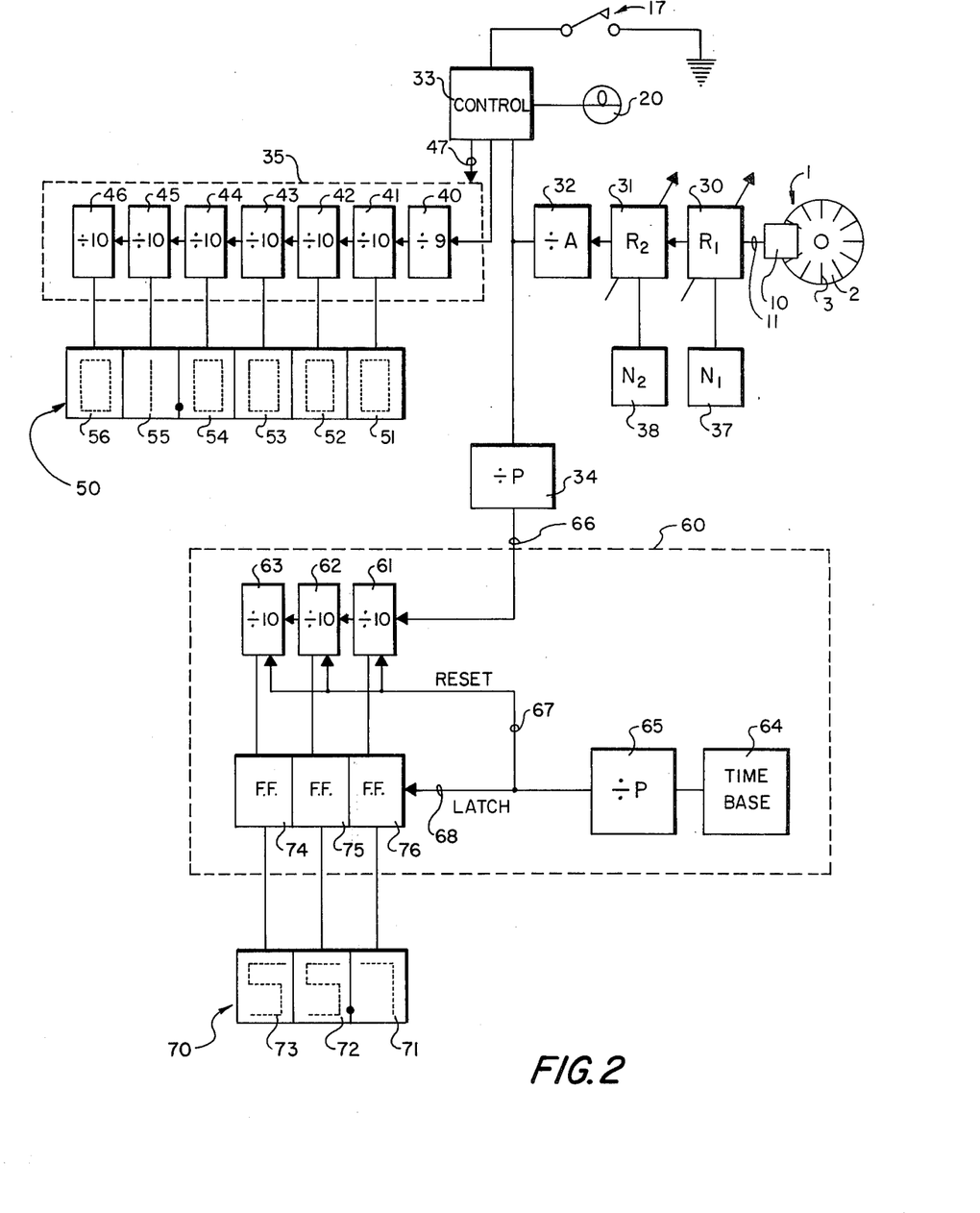
FIG. 2 is a block diagram of an embodiment of FIG. 1.

Referring to FIG. 2, there is shown a block diagram of the console 12 of FIG. 1. In the console 12, and coupled to the detector 10, there is provided a pair of substantially identical series-coupled, adjustable calibrating apparatus 30 and 31 and a pair of control circuits 37 and 38. Circuits 37 and 38 are provided for inserting a pair of calibrating numbers $N_1$ and $N_2$ in the apparatus 30 and 31 and include the switches 14 and 15 of console 12. Two calibrating apparatus 30 and 31 are employed for providing coarse and fine calibrations. The specific type of apparatus which is employed depends on whether a linear or a digital apparatus may be used. Because either type may be required in a given case, embodiments of each type are described below, following a general description of the remainder of the block diagram.

For increasing the accuracy of the total apparatus, there is coupled to the output of the calibrating apparatus 31 a divide-by-A circuit 32. The divide-by-A circuit 32 is provided for dividing the pulse output of the encoding assembly 1 by a predetermined factor having a magnitude which is a function of the number of sensible elements 3 on the disk 2 and the average number of revolutions the disk is expected to make over a predetermined distance. In general, as the number of the elements 3 is increased, the value of A increases proportionately. This has the effect, as will become apparent, of increasing the accuracy of the apparatus by moving bit errors to less significant positions. Specifically, the number of elements 3 and the value of A are chosen such that a predetermined number of pulses will be presented at the output of the circuit 32 when the disk 2 has rotated a predetermined number of times. For example, in a typical embodiment, when the disk 2 averages 1000 revolutions per mile, the number of elements 3 is 184 and the value of A is 2.

Coupled in parallel to the output of the divide-by-A circuit 32 is a control circuit 33 and a mileage totalizing circuit 35; and a divide-by-P circuit 34 and a speedometer circuit 60. The control circuit 33 is provided for controlling the accumulation of mileage in the mileage totalizing circuit 35. It is connected to the push button 17 and, when the button 17 is activated, it turns on the light 20, generates a reset signal on a line 47 and couples the circuit 35 to the circuit 32. The circuit 34 is provided for reducing error in the display of speed in the speedometer circuit 60, as will be described in detail below.

In mileage totalizing circuit 35 there is provided a divide-by-9 circuit 40. Coupled to the output of the divide-by-9 circuit 40 there is provided in series a plurality of divide-by 10 circuits 41, 42, 43, 44, 45 and 46. Coupled to the clear inputs of the circuits 40-46 is the line 47 of the control circuit 33. The line 47 is coupled to the circuits 40-46 for clearing the circuits before each distance measurement. For displaying the status of each of the divide-by-10 circuits 41-46, there is provided a display circuit means 50 comprising a plurality of stages 51, 52, 53, 54, 55 and 56. Stages 51-56 are coupled, respectively, to the divide-by-10 circuits 41-46 and comprise the seven-segment LED stages described for the display 19 of FIG. 1.

In the speed totalizing circuit 60 there is provided a plurality of divide-by-10 circuits 61, 62 and 63 and a time-base generator 64. Generator 64 is provided for generating control signals at predetermined intervals. Coupled to the output of the time-base generator 64 there is provided a divide-by-P circuit 65. Coupled to corresponding ones of the division circuits 61-63 there is provided a plurality of latching circuits 74, 75 and 76. The divide-by-10 circuits 61-63 are coupled to the output of the divide-by-P circuit 34 by means of a line 66. The output of the divide-by-P circuit 65 is coupled to the reset inputs of the divide-by-10 circuits 61-63 by a reset line 67 and to the latch inputs of the latching circuits 74-76 by a control line 68 for latching the outputs of the division circuits 61-63 for a predetermined interval under the control of the time-base generator 64.

For displaying the status of the divide-by-10 circuits 61-63, there is provided a digital display circuit 70. Circuit 70 comprises a plurality of stages 71, 72 and 73, each of which is coupled to a corresponding one of the divide-by-10 circuits 61-63 through the latches 74, 75 and 76. The stages 71-73 correspond to the seven-segment LED stages described above for the display 18 of FIG. 1.

The actual period of the interval between outputs from the time-base generator 64 depends on the pulse rate of the detector assembly 1 and is chosen so as to provide a direct readout of speed on the display circuit 70. The divide-by-P circuits 34 and 65 and the actual value of P are chosen for providing greater accuracy by moving bit errors to less significant bit positions as described above with respect to divide-by-A circuit 32. For example, a typical time interval between outputs from generator 64 is 0.4 seconds which corresponds to 1/9000 hours. To improve accuracy, the pulses from the encoder assembly 1 are received over a longer period — e.g., say twice as long. To maintain the direct readout capability, as will be apparent, the number of pulses received must then be divided proportionally. Therefore, the value of P in circuits 34 and 65, in the present example, is 2. However, because they are provided to enhance accuracy, it is understood that the divide-by-P circuits 34 and 65 and divide-by-A circuit 32 may be omitted if desired without affecting the principal operation of the apparatus.

The adjustable calibrating apparatus 30 and 31 at the output of detector 10, as previously described, may be implemented with either linear components such as phase-locked oscillators or a gear assembly where an exact phase relationship between their respective inputs and outputs is required or desired. On the other hand, if an exact phase relationship is not required or desired, a digital circuit alone may be employed.

Figure 3:
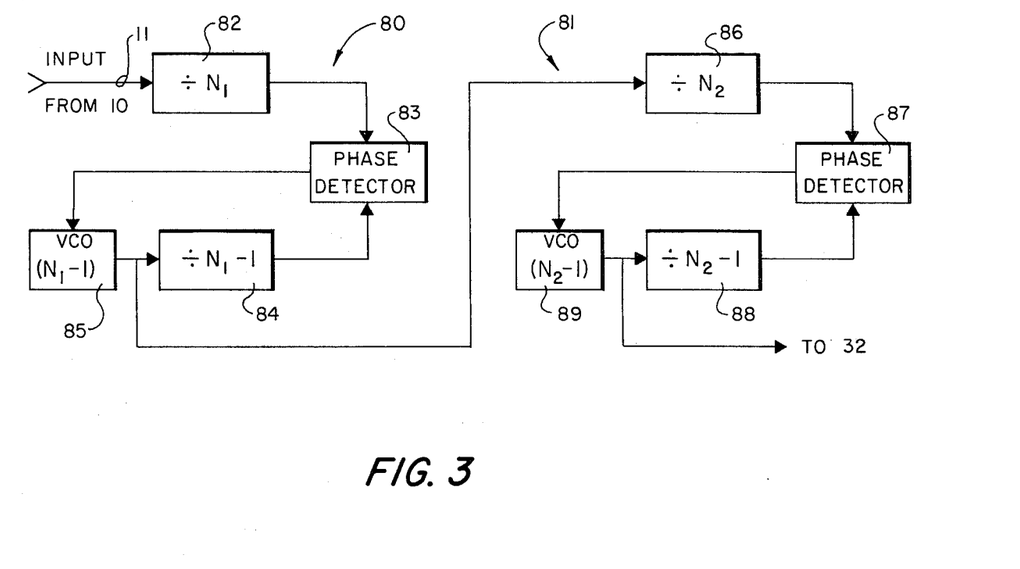
FIG. 3 is a block diagram of an embodiment of a pair of calibrators according to the present invention.

Referring to FIG. 3, there is provided in a first linear embodiment of an adjustable calibrating apparatus for use as apparatus 30 and 31 of FIG. 1, a pair of substantially identical phase-locked oscillating circuit means 80 and 81. Circuit 80 corresponds to apparatus 30, and circuit 81 corresponds to apparatus 31. In the circuit means 80 there is provided a divide-by-$N_1$ circuit means 82. The circuit 82 is provided for receiving pulses from the detector 10 on the line 11. The output of the circuit 82 is coupled to one input of a two-input phase detector circuit 83. The output of the phase detector circuit 83 is coupled to the input of a voltage-controllable oscillator (VCO) 85. The output of the VCO 85 is coupled to the input of a divide-by-$(N_1-1)$ circuit 84, and the output of the circuit 84 is coupled to the second input of the phase detector circuit 83 for controlling the VCO 85.

In the circuit 81 there is provided a divide-by-$N_2$ circuit means 86. The output of the VCO 85 is coupled to the input of the divide-by-$N_2$ circuit 86. The output of the circuit 86 is coupled to one input of a dual-input phase detector circuit 87. The output of the phase detector circuit 87 is coupled to the input of a voltage-controllable oscillator (VCO) circuit 89. The output of the circuit 89 is coupled to the input of the divide-by-$(N_2-1)$ circuit 88, and the output of the circuit 88 is coupled to the second input of the phase detector circuit 87 for controlling the VCO 89. The output of the VCO 89, which corresponds to the output of the adjustable calibrating circuit means 31 of FIG. 2, is provided with an output for coupling to the input of the divide-by-A circuit means 32.

Figure 4:
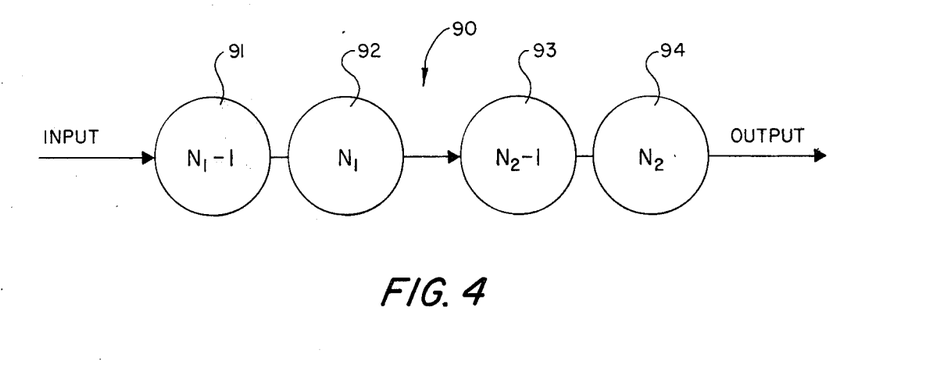
FIG. 4 is a block diagram of an alternative embodiment of a pair of calibrators according to the present invention.

A second embodiment of a calibrating circuit means implemented with linear components according to the present invention is shown in FIG. 4.

Referring to FIG. 4, there is provided a gear assembly 90. In the gear assembly 90 there is provided a first pair of intermeshed gears 91 and 92, corresponding to calibrating apparatus 30. The gear 92 has a number of teeth corresponding to $N_1$, and the gear 91 has a number of teeth corresponding to $N_1-1$. Coupled to the gears 91 and 92 there is provided a second set of intermeshed gears 93 and 94 corresponding to calibrating apparatus 31. The gear 94 has a number of teeth corresponding to $N_2$, and the gear 93 has a number of teeth corresponding to $N_2-1$. In practice, assembly 90 is incorporated in the apparatus of FIG. 2 using a digital-to-analog converter (not shown) for coupling the detector 10 to the gear 91 and an analog-to-digital converter (not shown) for coupling the gear 94 to the circuit 32.

Alternatively, the requirement for a digital-to-analog converter and an analog-to-digital converter may be avoided by inserting the assembly 90 ahead of the encoder assembly 1 between the drive line and the disk member 2 of the encoder assembly 1 for driving the disk 2 directly at a calibrated rate corresponding to the output of the gear 94.

The values $N_1$ and $N_2$ of FIGS. 2, 3 and 4 are calibrating numbers and must be determined each time the apparatus is calibrated. Consequently, whenever the apparatus is calibrated, the circuits 82, 84, 86 and 88 and the number of teeth on the gears 91-94, corresponding to the apparatus 30 and 31 of FIG. 2, must be adjusted accordingly. Because such adjustments in many cases will be time consuming and expensive, certain advantages are achieved using a switch-settable, wholly digital circuit means, as will now be described.

Figure 5:
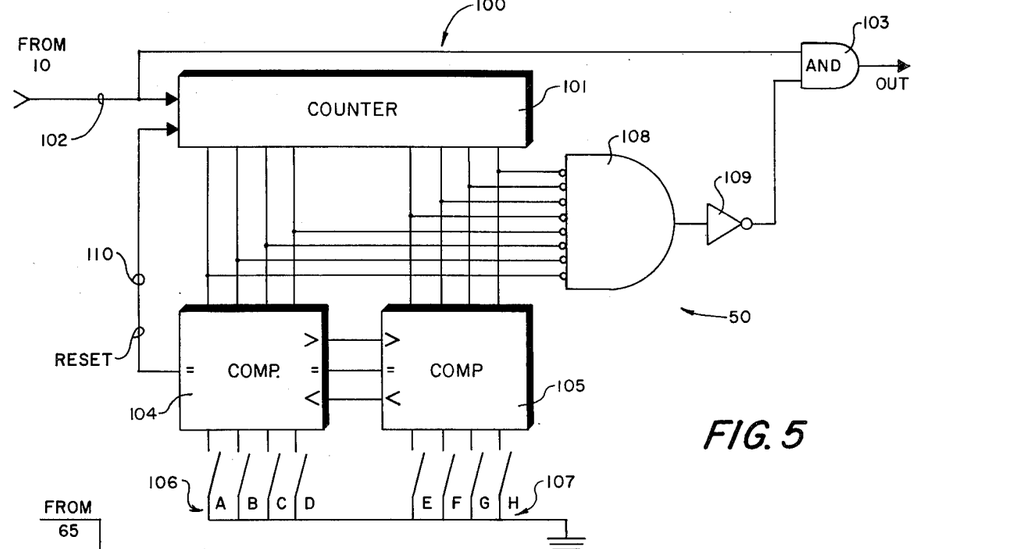
FIG. 5 is a block diagram of a digital embodiment of a calibrator according to the present invention.

Referring to FIG. 5, there is provided a digital calibrating circuit 100. Circuit 100 may be employed in both of the circuits 30 and 31 of FIG. 1. In circuit 100 there is provided an eight-stage counter circuit 101. At the input of the counter 101 there is provided an input line 102. Line 102 is provided for receiving pulses from the detector 10 and for routing the pulses from the detector 10 to the counter 101 and to one input of a plural-input AND gate 103. Coupled to the stages of the counter 101 is a pair of comparator circuits 104 and 105. Each of the comparator circuits 104 and 105 comprises eight inputs. Four of the inputs of each comparator are coupled to four of the stages of the counter 101, and four inputs are coupled, respectively, to two sets of four switch means 106 and 107. The lines interconnecting the comparator circuits 104 and 105 and the stages of the counter 101 are also coupled to a corresponding input of a plural-negative input AND gate 108. Coupled to the output of the AND gate 108 is an inverter circuit 109. The output of the inverter 109 is coupled to a second input of the AND gate 103. For reasons which will become apparent, the swtiches 106 and 107 are employed for inserting a binary-coded hexidecimal number $N_1$ or $N_2$ in the comparator circuits 104 and 105. As described above with respect to the FIGS. 3 and 4, the numbers $N_1$ or $N_2$ inserted in the circuit 100 by means of the switches 106 and 107 are known as calibrating numbers and are determined and employed to accommodate variations in the system due to various system conditions including tire wear, inflation, etc.

The purpose of each of the calibrating apparatus 30 and 31, whether they embody the apparatus of FIG. 3, FIG. 4, or FIG. 5, is to control the number of pulses delivered from the encoding apparatus 1 to the mileage-totalizing circuit 35 and speed circuit 60. The control is provided so that the number of pulses delivered over a predetermined distance is a predetermined number. To insure that a sufficient number of pulses are generated, the disk member 2 of the encoding apparatus 1 is provided with a sufficient number of sensing elements 3 to that, whatever the magnitude of the required calibration, both of the calibrators always "ratio down" to give a perfect calibration against a measured mile. Additionally, this has the advantage of avoiding having to deal with calibrations of an opposite polarity. For example, if a vehicle's tires are over-inflated, it would ordinarily be necessary to "add" pulses because the number of revolutions its drive shaft makes over a given distance is less than the number of revolutions it makes when the tires are properly inflated. On the other hand, if the tires are under-inflated, the opposite is true. Therefore, by providing a few additional pulses each revolution, the apparatus is made to appear as if the tires are always in an under-inflated condition. Accordingly, the same type of calibration — i.e., a "ratio down" — is made each time, regardless of the actual inflation level of the tires, be they over- or under-inflated.

In accordance with the foregoing, each of the calibrating apparatus of the present invention, as described above with respect to FIGS. 2, 3, 4 and 5, is adapted to provide a "divide down ratio" R, given by the equation:

$$R = (N - 1)/N$$

where N is the above described calibrating number and is an integer between 2 and 256. This provides for a very fine resolution which follows a "square law" principle. That is, the value of R for $N = A$ and the value of R for $N = A+1$ differ by one part in $N^2$. For example, for $N = 100$, $R = 99/100$ or 0.990000. For $N = 101$, $R = 100/101$ or 0.990099. The difference is 0.000099. This represents a change of 0.000099/0.990000 or 1/10000, which is equivalent to one part change in 10,000. The same relationship can be shown by the following expression:

$$\frac{R_{100}}{R_{101}} = \frac{\frac{99}{100}}{\frac{100}{101}} = \frac{100^2 - 1}{100^2} = 1 - \frac{1}{10000}$$

This shows that the two ratios differ by one part in $N^2$.

In practice, as previously described, it is found preferable to use a minimum of two calibrators for providing coarse and fine calibration. This requires the use of the two calibrating numbers $N_1$ and $N_2$ such that the product of the output M of the apparatus before calibration and the ratios $R_1$ and $R_2$ will equal, after calibration, a predetermined number at the end of a predetermined distance, such as, for example, 01.0000. For convenience, the numbers $N_1$ and $N_2$ are determined using a table of precalculated ratios R. An excerpt of pertinent portions of the table used in an example below is as follows:

| N | $\frac{N-1}{N}$ | BC Hexidecimal Switch Settings | |
|---|---|---|---|
| 1 | .00000000 | 0000 | 0001 |
| 2 | .50000000 | 0000 | 0010 |
| 3 | .66666666 | 0000 | 0011 |
| 4 | .75000000 | 0000 | 0100 |
| 5 | .80000000 | 0000 | 0101 |
| 6 | .83333333 | 0000 | 0110 |
| . | | | |
| 15 | .93333333 | 0000 | 1111 |
| 16 | .93750000 | 0001 | 0000 |
| 17 | .94117647 | 0001 | 0001 |
| 18 | .94444444 | 0001 | 0010 |
| . | | | |
| 86 | .98837209 | 0101 | 0110 |
| 87 | .98850574 | 0101 | 0111 |
| 88 | .98863636 | 0101 | 1000 |
| 89 | .98876404 | 0101 | 1001 |
| . | | | |
| 166 | .99397590 | 1010 | 0110 |
| 167 | .99401197 | 1010 | 0111 |
| 168 | .99404761 | 1010 | 1000 |
| 169 | .99408284 | 1010 | 1001 |

-continued

| N | $\frac{N-1}{N}$ | BC Hexidecimal Switch Settings | |
|---|---|---|---|
| ⋮ | | | |
| 252 | .99603174 | 1111 | 1100 |
| 253 | .99604743 | 1111 | 1101 |
| 254 | .99606299 | 1111 | 1110 |
| 255 | .99607843 | 1111 | 1111 |
| 256 | .99609375 | 0000 | 0000 |

The use of the above table with the apparatus of the present invention will now be described. At the beginning of a measured mile, the switch 17 on the console 12 is actuated. This actuates the control circuit 33 for clearing the mileage totalizer circuit 35 and couples it to the encoding assembly 1. At the end of the measured mile, the switch is again activated. This disconnects the totalizing circuit 35 from the encoding apparatus 1 and displays the sum of the pulses generated on the display 50 for providing a direct readout in miles. For example, if 90,000 pulses are generated over the course of the measured mile at the input to the circuit 35, which corresponds to the output of the calibrators 30, 31, the division circuits will divide the pulses to cause the display 50 to read 01.0000, a readout corresponding precisely to one mile. However, if the apparatus is not calibrated, in the course of driving a measured mile, the detector 10 will generate some number of pulses greater than 90,000 pulses at the input to the mileage totalizing circuit 35. For example, the number of pulses generated may be 96201. The number of pulses generated is a function of the number of elements 3 on the disk 2 and the number of revolutions of the disk 2 over a measured distance. As will be recalled from the previous discussion, the number of elements 3 are chosen such that a minimum calibration is required at all times in order to avoid having to deal with a calibration of opposite polarity. With an input of 96201 pulses, the mileage totalizing circuit 35 will provide, in the divide-by-10 circuits 41-46, a six-digit output M to the display circuits 50, which will appear therein as the number 01.0689. The initial reading of 01.0689 is obtained by disabling both calibrators so that $R_1 = R_2 = 1.0000$. The disabling of the calibrators, as will be described further below, simply provides for the number of pulses from the encoding assembly 1 to pass through the calibrators without alteration. Thus $M \times R_1 \times R_2 = M \times 1 \times 1 = 1.0689$.

It will be recalled from the above discussion that, when the apparatus is properly calibrated, the output of the display circuit 50 must read 01.0000 at the end of a measured mile. Consequently, the product $M \times R_1 \times R_2$ must equal 01.0000. The following is an explanation of the calculation of $R_1$ and $R_2$. Let $$R_1 = \frac{N_1 - 1}{N_1}; R_2 = \frac{N_2 - 1}{N_2}; \quad (1)$$

$$M \times R_1 \times R_2 = 01.0000 \quad (2)$$

$$M = 1.0689 \quad (3)$$

$R_1$ = coarse and $R_2$ = fine

Initially solve for $R_2$ as follows: Using the maximum number 256 from the table for $N_2$ in the equation for $R_2$ and solving $$R_2 = \frac{N_2 - 1}{N_2} = \frac{256 - 1}{256} = .99609375 \quad (4)$$

Substituting M and $R_2$ in equation (2) and solving for $R_1$ (approx.):

$$R_{1\,(approx.)} = \frac{1.0000}{1.0689 \times .99609375} = .93920993 \quad (5)$$

From the table, choose the next highest number closest to $R_1$ (approx.) for $R_1$ (exact)

$$R_{1\,(exact)} = .94117647 = \frac{16}{17} \text{ for } N_1 = 17 \quad (6)$$

Substitute $R_1$ (exact) in equation (2) and solve for $R_2$ (approx.)

$$R_{2\,(approx.)} = \frac{1.0000}{M \times R_{1\,(exact)}} = \frac{1.0000}{1.0689 \times .94117647} \quad (7)$$

Choose the closest value of $R_2$ (approx.) in the table for $R_2$ (exact)

| | | |
|---|---|---|
| $R_{2\,(approx.)}$ | | .99401197 |
| | $N_2 = 167$ | .99401253 |
| | $N_2 = 168$ | .99404761 |
| $R_{2\,(approx.)} - R_{167}$ | | = .00000056 |
| $R_{168} - R_{2\,(approx.)}$ | | = .00003508 |

$R_2$ (exact) is closer to $R_{167}$ than $R_{168}$ and therefore $$R_{2\,(exact)} = .99401197 = \frac{166}{168} \text{ for } N_2 = 167 \quad (10)$$

From the above
$N_1 = 17$
$N_2 = 167$
A check of the calculations is made as follows $M \times R_1 \times R_2$ $1.0689 \times .94117647 \times .99401197 = .99999940$ (11)

or $1.0689 \times \frac{16}{17} \times \frac{166}{167} = .99999940$ (12)

Subtracting,
$\phantom{-\ }1.00000000$
$-\ .99999940$
$\phantom{-\ }\overline{.00000060}$ The accuracy of the calibration is found to be within 6 parts in 10 million.

Once determined using the table described above, numbers $N_1$ and $N_2$ are employed for setting the calibrating apparatus. The manner in which the numbers are employed depends on which of the calibrating apparatus is employed. If the apparatus of FIG. 3 is employed, the calibrating number $N_1$ is used for setting the dividing circuits 82 and 84 and the center frequency of the VCO 85, while the calibrating number $N_2$ is used for setting the dividing circuits 86 and 88 and the center frequency of the VCO 89. Similarly, in the apparatus as shown in FIG. 4, the calibrating numbers $N_1$ and $N_2$ are used for setting the number of teeth on the gear means 91 and 92, 93 and 94, respectively.

Referring to FIG. 5, there is provided in each of the switch sets 106 and 107 of the apparatus 100 four separate switching members A, B, C and D, and E, F, G and H, respectively. The switching members A–H are provided for setting in the comparator circuits 104 and 105, respectively, a binary coded hexidecimal number corresponding to any decimal number between 2 and 256 listed in the above table which is chosen as $N_1$ or $N_2$. If, as is intended, an apparatus 100 is used in each of the calibrating units 30 and 31 of FIG. 1, both coarse and fine calibrations will be made and, accordingly, both an $N_1$ and $N_2$ will be used.

For example, if one of the apparatus 100 is used in each of the circuits 30 and 31 of FIG. 1 and if, as calculated above, the number $N_1 = 17$ and the number $N_2 = 167$, the binary coded numbers set in the comparator circuits 104 and 105 by means of the switches 106 and 107 are from the table, respectively, 0001 0001 and 1010 0111. The numbers are set in the switches by opening and closing the switches. It is understood, however, that whether the switches are opened or closed to set in the "ones" and zero's depends entirely on the type of logic used and does not otherwise affect the operation of the apparatus. With $N_1$ and $N_2$ set in the calibrating apparatus, the apparatus 30 will output 16 out of 17 input pulses while the calibrating apparatus 31 will output 166 out of every 167 pulses which it receives from the output of the calibrator 30.

The manner in which the apparatus 100 operates in the apparatus of FIG. 1 is as follows: Pulses at the input of the apparatus 100 are fed to the counter 101 and to one input of the AND gate 103. The pulses received at the input of the counter 101 are accumulated in the counter. When the number of pulses accumulated equals the number set in the switches 106 and 107, there is a match. The match results in the generation of a reset pulse by the comparator circuits 104 and 105 on a line 110. The reset pulse on the line 110 resets the counter 101. The resetting of the counter 101 provides a low or zero level on all the inputs to the negative input AND gate 108. A zero input on all of the inputs of the AND gate 108 results in a logical "one" on its output. The "one" is then inverted by the inverter circuit 109 for disabling or inhibiting the gate 103 for the period of one pulse. It is the disabling of the gate 103 for the period of one pulse that results in the generation of an output signal on the output of the gate 103 that corresponds to the ratios $R_1$ or $R_2$. This process is equivalent to throwing away (inhibiting) one pulse out of N, and provides the basis for the expression $R = (N - 1)/N$.

Once calibrated to provide an accurate readout of the distance a vehicle is moved, a readout of the speed of the vehicle with a corresponding accuracy is also available with the apparatus of FIG. 2.

Referring again to FIG. 2, it will be recalled that the output pulses from the calibrators 30 and 31 are coupled to the three divide-by-10 circuits 61, 62 and 63. The circuits 61–63 are provided for totalizing the pulses over a predetermined time period determined by the time-base generator 64. The time-base generator 64 is adapted to provide an output every 0.4 seconds. This output, in turn, provides a reset pulse on the line 67 and a latch signal on the line 68 at predetermined intervals. The precise length of the intervals depends on the value of P in the divide-by-P circuit 65. The period 0.4 seconds is chosen because of its reciprocal correspondence to the number of pulses generated by the disk 2 of the detector assembly 1 in a mile distance when the disk 2 of the assembly 1 employs 90 sensible elements 3 and turns 1000 times each mile. For example, at 50 miles per hour, the number of pulses fed into the speed totalizer in 0.4 seconds is given by the following equation:

$$\frac{\text{Pulses}}{.4 \text{ sec}} = \frac{90,000 \text{ pulses}}{\text{Mi.}} \times \frac{50 \text{ miles}}{\text{hr.}} \times \frac{1 \text{ hr}}{9000} = 500 \text{ pulses} \quad (13)$$

Therefore, during each 1 hr/9000 or 0.40 seconds, 500 pulses are totalized and latched to give a reading of 50.0 mph. It is to be understood, however, that the period of the time-base generator may be changed to accommodate a corresponding change in the number of sensible elements 3 and a change in the speed of rotation of the disk 2. The divide-by-P circuits 34 and 65 and a suitable choice for the value P will be discussed further below following a further discussion of the time-base generator 64.

In the apparatus of FIG. 2 the time-base generator 64 is non-resettable. If a time-base generator is non-resettable, it continuously free runs asynchronously with respect to the output of the detector assembly 1. This results in a somewhat erroneous speed reading because in any given chosen time slot more pulses may occur than may occur in a succeeding time slot and vice versa. The net result is a variation in the least significant digit in the output of the speed totalizer (1/10 mph). The variation, however, is such that the duty cycle can be extrapolated to give the next digit (0.01 mph). For example, a speed of 66⅔ mph, which equals approximately 66.66 mph would be expected to appear in the indicating circuit 70 as 66.6 for ⅓ of the time and 66.7 for ⅔ of the time. This is tantamount to "beating." If a resettable time-base generator is employed, however, a more accurate and repeatable speed reading can be obtained. That is, after each sample (each 0.40 seconds, or other time period, depending on the value of P in circuits 34 and 65), the time-base generator can be allowed to run or it can be momentarily held until the next encoding pulse is generated. This encoding pulse is defined as the "restart" signal. Upon the generation of the restart signal, the time-base generator can be reset (or released if held) so that the time-base generator and the encoder pulse stream are synchronously started together, removing the problem associated with asynchronous operation. This results in absolute repeatability and removes the "duty cycle" or "beating" phenomena.

It will be appreciated that as the pulses received from detector 10 are counted in the counter 101 of the apparatus of FIG. 5, an error will build up in the counter 101 until it reaches a maximum of one bit immediately prior to "throw away." With a resettable time base, however, the one bit error which exists just prior to "throw away" can be reduced to one-half bit by setting the calibrator 101 to N/2 under the control of the restart signal. This may be accomplished using an apparatus as shown in FIG. 6.

Figure 6:
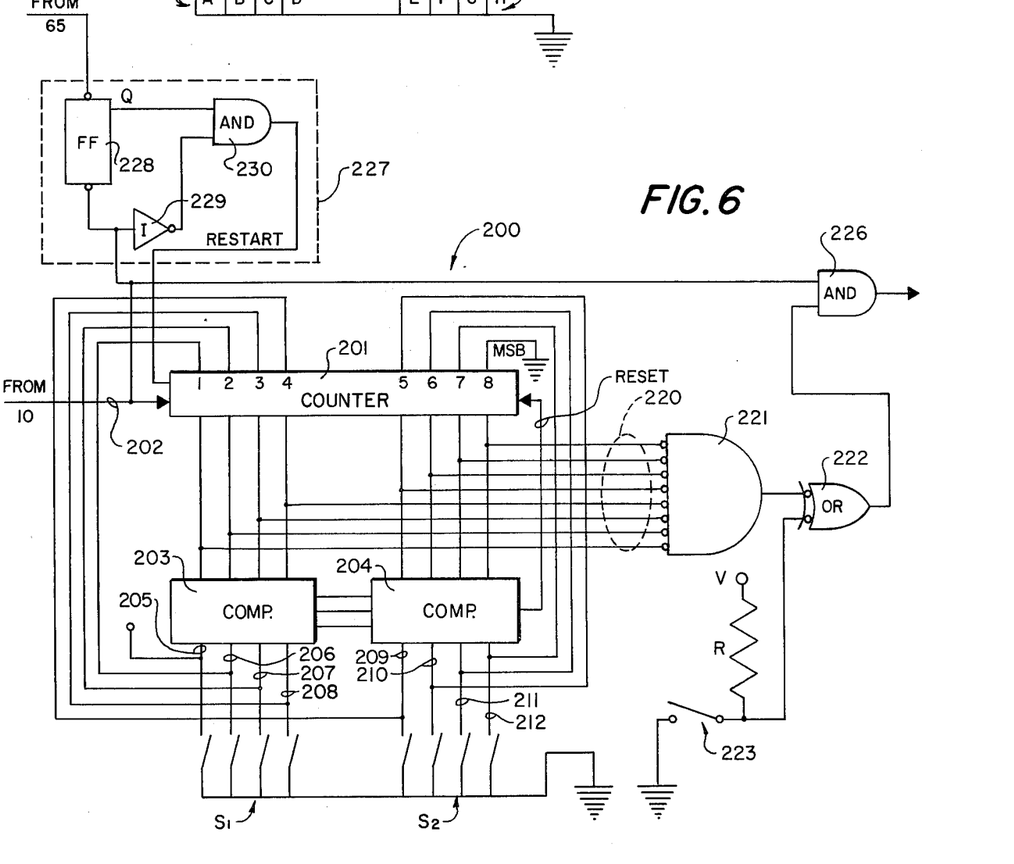
FIG. 6 is a block diagram of still another digital calibrator according to the present invention.

Referring to FIG. 6, there is provided in calibrating circuit 200, an eight-stage counter 201. The counter 201 is provided with an input 202. The input 202 is provided for coupling the counter 201 to the detector assembly 10. Coupled to the counter 201 is a pair of comparator circuits 203 and 204. The comparator circuit 203 is provided with a plurality of input lines 205, 206, 207 and 208. The lines 206, 207 and 208 are coupled in parallel to the set inputs of the first three stages of the counter 201. The comparator circuit 204 is provided with a plurality of input lines 209, 210, 211 and 212. The line 209 is connected to the set input of the fourth stage of the counter 201, and the lines 210, 211 and 212 are connected in parallel, respectively, to the set inputs of the fifth, the sixth and the seventh stages of the counter 201. The set input of the eighth or MSB stage of the counter 201 is coupled to ground. The set inputs of the counter 201 are called the "parallel load" inputs. Coupled to the lines 205–208 and the lines 209–212, there is provided also a plurality of switches $S_1$ and $S_2$. Each of the switches $S_1$ and $S_2$, like switches 106 and 107 of FIg. 5, comprises four switching members for inserting the calibrating numbers $N_1$ or $N_2$ in the apparatus. The connection of the lines 205–212 to the "parallel load" inputs of the counter 201 and the grounding of the MSB stage of counter 201 are an N/2 connection and the setting of $S_1$ and $S_2$ causes N/2 to be loaded into the counter upon the receipt of a restart signal.

Each stage of the counter 201 is also coupled to a corresponding input of the comparator circuits 203 and 204 and, by a plurality of lines designated generally as 220, to a negative input AND gate 221 and one input of a dual-negative input "OR" circuit 222. The second input of circuit 222 is coupled to a source of potential V through a resistor R. A switch 223, which is one of the control switches 16 on the panel 13 of console 12, is provided coupled to ground and manually operable for selectively connecting the second input of the circuit 222 to ground. In the output of the circuit 200 there is provided a dual-input AND gate 226. One input of gate 226 is coupled to the output of the circuit 222. The second input of the gate 226 is coupled to the input line 202.

The restart signal is generated in a circuit 227. In the circuit 227 there is provided a flip-flop 228, an inverter circuit 229 and an AND circuit 230. The set input of the flip-flop is coupled to the output of the divide-by-P circuit 65 and the reset input of the flip-flop and inverter circuit 229 are coupled to the encoder assembly 1. The AND circuit 230 is coupled to the Q output of the flip-flop 228 and to the output of the OR circuit 229. The output of the AND circuit 230 is coupled to the load control input of the counter 201.

In the operation of the present invention using the apparatus of FIG. 6, a calibrating number $N_1$ or $N_2$ is calculated, as discussed above with respect to the apparatus of FIG. 5. Upon the occurrence of the first encoder pulse received from detector 10, following the setting of the flip-flop 228 by a pulse from the divide-by-P circuit 65, the AND circuit 230, coupled to the parallel load input control line of counter 201, will generate a restart pulse for loading N/2 in the counter 201. Succeeding pulses received from detector 10 will accumulate in the counter 201 until the contents of the counter 201 match the calibrating number set in the switches $S_1$ and $S_2$. When a match occurs, a reset signal is generated by the comparator 204, resetting the counter 201 to zero. When the counter 201 is set to zero, a signal is provided at the output of AND gate 221 and OR gate 222 for disabling the AND gate 226 for a period of one pulse. This amounts to "throwing away" one pulse. For example, if the calibrating number inserted in the switches $S_1$ and $S_2$ corresponds to the number 100, the number of pulses which will issue from the gate 226 out of every 100 pulses will be 99 pulses. Also, it may be noted that, since the counter 201 was initially set to N/2, the accumulated error which will occur immediately prior to throw away will be one-half that which exists at the same time in the apparatus of FIG. 5, thereby reducing the accumulated error by one-half bit.

An odometer-speedometer apparatus and, in particular, several specific embodiments of a novel calibrating apparatus are described. The embodiments described are considered preferable. For some applications, however, it is contemplated that various other changes may be made to the apparatus described without departing from the spirit and scope of the present invention. For example, to reduce the number of display stages, the three and six-stage display circuits 18 and 19 may be replaced by a three-stage display circuit and a multiplexing circuit with suitable controls for multiplexing the outputs of the division circuits 41–46 and 61–63.

In addition to the changes that may be made in the apparatus, without departing from the spirit and scope of the present invention, there is also an alternative method for determining the calibrating numbers $N_1$ and $N_2$, which is simpler than doing the calculations described above. For example, the calibrating number $N_1$ may be determined by driving the measured mile with the calibrators in a disabled condition and observing, at the end of the measured mile, the number which appears in the odometer display. This number is divided into a constant. The constant is 1.0039215 and equals the ratio 256/255. The quotient is then used to determine from the table the next highest ratio and its corresponding number $N_1$. The number chosen may then be inserted in one of the calibrators. After one of the calibrators is set with the number $N_1$ and enabled, the mile is traversed again and once again the number appearing in the odometer display is determined. As before, this number is divided into a constant. The constant is 1. The quotient is then used for choosing from the table the closest ratio and its corresponding number $N_2$. While traveling the measured mile twice to determine the necessary calibrating numbers is time-consuming, it is a simpler alternative to making the otherwise more complicated calibrations. For the foregoing reasons it is intended that the scope of the invention be not limited to the embodiments and methods described, but be determined by reference to the claims hereinafter provided.

What is claimed is:

1. A speedometer and odometer apparatus comprising:

means for generating pulses as a function of the distance a vehicle is moved;

means for calibrating the number of pulses generated by the pulse-generating means, said calibrating means comprising counter means coupled to the pulse-generating means for counting pulses received from the pulse-generating means;

circuit means including switch means for setting a calibrating number in the apparatus;

comparing means coupled to said counter means and said circuit means for comparing the contents of said counter means and said calibrating number, and generating a control signal when a predetermined relationship exists between said counter contents and said calibrating number;

gate means forming an output of said calibrating means coupled to said pulse-generating means for gating therethrough pulses received from said pulse-generating means to said output of said calibrating means; and means responsive to the control signal generated by said comparing means when said predetermined relationship exists for inhibiting said gate means during the time of receipt of a predetermined number of said pulses from said pulse-generating means so that less than the total number of pulses generated by said pulse-generating means is gated through said gate means for providing said calibrating of the number of pulses received from said pulse-generating means; and means coupled to the output of said calibrating means for indicating said distance.

2. An apparatus according to claim 1 wherein said means in said calibrating means comprises means for providing at the output of said calibrating means (N − 1) out of N pulses received by said gate means.

3. An apparatus according to claim 1 wherein said calibrating means comprises means for reducing a one-bit error which would exist in the output of the calibrating means at the time of the generation of said control signal in the absence of said reducing means to a one-half bit error at said time.

4. An apparatus according to claim 3 wherein said error-reducing means comprises means for presetting the counter means to N/2 under control of a restart signal.

5. An apparatus according to claim 1 wherein said calibrating means for providing a coarse calibration of the output of said pulse-generating means and a second calibrating means, coupled in series with said first calibrating means, for providing a fine calibration of the output of said pulse-generating means.

6. An apparatus according to claim 5 comprising means for visually indicating the speed of said vehicle and means for coupling both said speed-indicating means and said distance-indicating means to the output of said first and said second calibrating means for providing the same calibrated input to both said speed and said distance-indicating means.

7. An apparatus according to claim 1 further comprising means coupled to the output of the calibrating means for visually indicating the speed of movement of said vehicle.

8. An apparatus according to claim 7 further comprising means for visually indicating the distance said vehicle moves to an accuracy of at least one part in 10,000 and said speed to an accuracy of one part in 10,000, readable to the nearest 1/10 mph.

9. An apparatus according to claim 8 wherein said visual indicating means comprises:

means forming a first and a second plurality of serially connected decade division circuits coupled to the output of said calibrating means;

means forming a visual indicator having at least three stages; and switch means selectively coupling selected ones of said division circuit means in a multiplexing manner to said visual indicator means for indicating at least six stages of distance information and at least three stages of speed information with respect to the distance and speed of movement of said vehicle.

10. An apparatus according to claim 7 wherein said speed-indicating means comprises:

a time base for generating a control signal, said signal being generated at a predetermined period;

means for receiving pulses from said calibrating means during said predetermined period; and means responsive to said pulse-receiving means and said control signal for providing an output proportional to the number of pulses received in said predetermined period.

11. An apparatus according to claim 1 further comprising means coupled to the output of said calibrating means for dividing the number of pulses received from said calibrating means by a predetermined factor for providing a direct readout of the distance of said movement of said vehicle.

12. An apparatus according to claim 1 further comprising means coupled to the output of said calibrating means for dividing the number of pulses received from said calibrating means by a predetermined factor for providing a direct readout of the speed of said movement of said vehicle.

13. An apparatus according to claim 11 wherein said dividing means further comprises means for dividing the number of pulses received from said calibrating means by a predetermined factor for moving an error in the number of said pulses to a less significant bit position.

14. An apparatus according to claim 12 wherein said dividing means comprises means for dividing the number of pulses received from said calibrating means by a predetermined factor for moving an error in the number of said pulses to a less significant bit position; and further comprising:

a time-base generator for outputting a signal at predetermined intervals; and means for accumulating the number of pulses received from said pulse-generating means in said dividing means during said predetermined intervals.

15. An apparatus according to claim 14 further comprising:

means coupled to said time-base generator for increasing the time interval during which pulses received in said dividing means from said calibrating means are accumulated; and means for dividing the number of pulses received from said calibrating means by a factor signal equal to the factor by which said accumulating interval is increased.

16. An apparatus according to claim 15 wherein the beginning of said accumulating intervals is synchronized with pulses from said calibrating means.

17. A speedometer and odometer apparatus comprising:

means for generating pulses as a function of the distance a vehicle is moved;

means for calibrating the number of pulses generated by the pulse-generating means, said calibrating means comprising:

a first phase-locked loop for receiving $N_1$ input pulses from said pulse-generating means and providing an output of $(N_1 - 1)$ pulses; and a second phase-locked loop coupled to the output of said first phase-locked loop for receiving $N_2$ input pulses from said first phase-locked loop and providing an output of $(N_2 - 1)$ pulses.

18. A speedometer and odometer apparatus comprising means for providing an output as a function of the distance a vehicle is moved, and means coupled to said output for calibrating said output, comprising:

first gear means having an output of $(N_1 - 1)$ revolutions for an input of $N_1$ revolutions; and second gear means, coupled to said first gear means, having an output of $(N_2 - 1')$ revolutions for an input of $N_2$ revolutions of the output of said first gear means to provide selected combinations of said $N_1$ and said $N_2$ revolutions of said gear means.

19. A method of measuring the distance and the speed of movement of a moving vehicle comprising the steps of:

generating pulses as a function of the distance a vehicle is moved;

calibrating the number of pulses generated, said step of calibrating comprising the steps of counting the pulses generated, generating a calibrating number, comparing the number of pulses generated with said calibrating number;

generating a control signal when a predetermined relationship exists between the number of pulses counted and the calibrating number;

applying the control signal generated when the predetermined relationship exists to a gating means receiving the generated pulses for inhibiting the gating means during the time of receipt of a predetermined number of the generated pulses so that less than the total number of pulses generated by the pulse-generating means is gated through the gating means for providing the calibrating of the number of pulses received from the pulse-generating means; and visually displaying the calibrated output for indicating said distance and speed.

20. A method according to claim 19 wherein said step of generating a calibrating number comprises the steps of:

driving a measured mile;

counting the total number of pulses M generated during said step of driving;

calculating a number $R_{1(approximate)}$ using the number of pulses M counted during said counting step and the equation $$M \times R_1 \times R_2 = 01.0000$$

where $$R_2 = (N_2 - 1)/N_2$$

and $N_2 =$ the highest number in a table of precalculated numbers $(N - 1)/N$ for $N = 1, 2, 3 \ldots$;

selecting from said table of precalculated numbers, the next highest number $(N - 1)/N$ closest to $R_{1(approximate)}$ for obtaining a number $R_{1(exact)}$;

calculating a number $R_{2(approximate)}$ using the number of pulses M counted during said counting step and the equation $$M \times R_{1(exact)} \times R_{2(approximate)} = 1.0000;$$

selecting from said table of precalculated numbers the number $(N - 1)/N$ closest to $R_{2(approximate)}$ for obtaining a number $R_{2(exact)}$; and selecting from said table of precalculated numbers $(N - 1)/N$ a first calibrating number $R_1$ corresponding to the number $R_{1(exact)}$ and a second calibrating number $N_2$ corresponding to the number $R_{2(exact)}$ such that $$(N_1 - 1)/N_1 = R_{1(exact)}$$

and $$(N_2 - 1)/N_2 = R_{2(exact)}.$$

21. A method according to claim 20 wherein the highest of the numbers N is at least 256.

* * * * *